US009288723B2

(12) United States Patent
Kubota et al.

(10) Patent No.: US 9,288,723 B2
(45) Date of Patent: Mar. 15, 2016

(54) APPARATUS, COMPUTER PROGRAMS AND METHODS FOR ENABLING FILTERING OF NEIGHBOR CELLS OR FREQUENCIES

(71) Applicant: Broadcom Corporation, Irvine, CA (US)

(72) Inventors: Keiichi Kubota, Surrey (GB); Brian Martin, Surrey (GB)

(73) Assignee: XIAOMI H.K. LIMITED, Wanchai (HK)

( * ) Notice: Subject to any disclaimer, the term of this patent is extended or adjusted under 35 U.S.C. 154(b) by 0 days.

(21) Appl. No.: 14/565,009

(22) Filed: Dec. 9, 2014

(65) Prior Publication Data

US 2015/0094068 A1 Apr. 2, 2015

Related U.S. Application Data

(63) Continuation of application No. 13/870,043, filed on Apr. 25, 2013, now Pat. No. 8,923,870, which is a continuation of application No. 13/472,611, filed on May 16, 2012, now Pat. No. 8,437,754, and a continuation of application No. 13/246,285, filed on Sep. 27, 2011, now abandoned.

(30) Foreign Application Priority Data

Sep. 27, 2011 (GB) .................................... 1116642.8

(51) Int. Cl.
*H04W 36/00* (2009.01)
*H04W 48/12* (2009.01)
*H04W 24/02* (2009.01)

(52) U.S. Cl.
CPC .......... *H04W 36/0061* (2013.01); *H04W 24/02* (2013.01); *H04W 36/0072* (2013.01); *H04W 48/12* (2013.01)

(58) Field of Classification Search
CPC .... H04W 36/0061; H04W 76/02; H04W 2/02
USPC .............. 455/447, 434, 439, 436, 226.2, 296; 370/331, 338, 261, 350
See application file for complete search history.

(56) References Cited

U.S. PATENT DOCUMENTS

2005/0111409 A1 5/2005 Spear et al.
2006/0183482 A1 8/2006 Ueda
(Continued)

FOREIGN PATENT DOCUMENTS

EP 1962531 A1 8/2008
EP 2214441 8/2010
(Continued)

OTHER PUBLICATIONS

Qualcomm:"Broadcasting Multiple Harmonized Frequency Bands Per Cell",3GPP Draft; R2-114158 Broadcasting Multiple Harmonized Frequency Bands Per Cell, 3rd Generation Partnership Project(3GPP), Mobile Competence Centre; 650, Route Des Lucioles; F-06921 Sophia-Antipolis Cedex,France; vol. RAN WG2, No. Athens, Greece; Aug. 22, 2011, Aug. 16, 2011,XP050539979, 4 pgs.

(Continued)

*Primary Examiner* — Nathan Taylor
(74) *Attorney, Agent, or Firm* — Oblon, McClelland, Maier & Neustadt, L.L.P.

(57) ABSTRACT

A serving cell sends to user equipments (UEs) indications of frequency bands supported by neighbor cells/frequencies, at least one individual neighbor cell/frequency supporting a plurality of frequency bands. The neighbor cells/frequencies are filtered by the UE to retain only those that are indicated to support a frequency band or frequency bands which are also supported by the UE. The sent indications comprise, for each respective neighbor cell/frequency, one absolute radio frequency channel number (ARFCN) associated with the respective neighbor cell/frequency and the frequency band or bands associated with the respective neighbor cell/frequency. Examples are given of various system information blocks for sending the frequency band indications to the UE. In one embodiment they are arranged in an information element IE having an entry for each of the neighbor cells/frequencies and a list of frequency bands for each entry.

20 Claims, 5 Drawing Sheets

(56) References Cited

U.S. PATENT DOCUMENTS

| | | |
|---|---|---|
| 2008/0207209 A1 | 8/2008 | Katori et al. |
| 2008/0226001 A1 | 9/2008 | Geng et al. |
| 2010/0136969 A1 | 6/2010 | Nader et al. |
| 2010/0330943 A1 | 12/2010 | Hoepfner |
| 2011/0143755 A1 | 6/2011 | Islam |

FOREIGN PATENT DOCUMENTS

| | | |
|---|---|---|
| WO | 9851103 | 11/1998 |
| WO | 2009050210 | 4/2009 |

OTHER PUBLICATIONS

Ericsson et al:"Multiple Frequency Band Indicators Per Cell",3GPP Draft; R2-114299 Multiple FBI, 3rd Generation Partnership Project(3GPP), Mobile Competence Centre; 650, Route Des Lucioles; F-06921 Sophia-Antipolis Cedex,France; vol. RAN WG2, No. Athens, Greece; Aug. 22, 2011, Aug. 16, 2011,XP050540038, 5 pgs.

"3rd Generation Partnership Project; Technical Specification Group Radio Access Network; User Equipment (UE) radio transmission and reception (FDD) (Release 10)", 3 GPP TS25.101 V10.2.0, Jun. 2011.

APPARATUS, COMPUTER PROGRAMS AND METHODS FOR ENABLING FILTERING OF NEIGHBOR CELLS OR FREQUENCIES

TECHNICAL FIELD

The present invention relates to apparatus, computer programs and methods for enabling filtering of neighbor cells or frequencies. The exemplary and non-limiting embodiments of this invention relate generally to wireless communication systems, methods, devices and computer programs and, more specifically, relate to their use in connection with neighbor cells that support multiple frequency bands.

BACKGROUND

The following abbreviations that may be found in the specification and/or the drawing figures are defined as follows:

| | |
|---|---|
| 3GPP | third generation partnership project |
| EARFCN | EUTRA absolute radio frequency channel number |
| EUTRA | evolved universal terrestrial radio access |
| IE | information element |
| LTE | long term evolution (EUTRA network) |
| LTE-A | LTE-advanced |
| RAN | radio access network |
| RF | radio frequency |
| SI | system information |
| SIB | system information block |
| UARFCN | UTRA absolute radio frequency channel number |
| UMTS | universal mobile telecommunication system |
| UE | user equipment |

Cellular radio communications now include individual cells operating on multiple radio frequency channels in order to better support a variety of different UEs, some of which may be capable of operating on only one of these frequency bands which is different from a band for which another UE in the cell is capable. Additionally, some bands in use by one cell may have some frequency portion overlapping with bands in an adjacent neighbor cell, particularly where such neighbor cells operate under different radio access technologies, such as for example UMTS and LTE. For example, in the HSPA version of UMTS, bands II and XXV have respective frequency bands 1930-1990 MHz and 1930-1995 MHz and thus are overlapping in frequency. There is a similar overlap among bands V (869-894 MHz), VI (875-885 MHz) and new band XXVI (814-849 and 859-894 MHz); bands IV (2110-2115 MHz) and X (2110-2170 MHz); and bands III (1805-1880 MHz) and IX (1844.9-1879.9 MHz).

Relevant to the above scenarios are certain proposals for LTE Release 10 set forth in document R2-114158 by Qualcomm entitled "Multiple harmonised bands per cell" and in document R2-114299 by Ericsson and ST-Ericsson entitled "Multiple frequency band indicators in a cell" (both from 3GPP TSG-RAN WG2 meeting #75; Athens, Greece; 22-26 Aug. 2011). Specifically, these documents propose that some cells which belong to a frequency in an overlapping band will broadcast the multiple bands they support according to variously named extension fields for the SIB1. In the examples given, these are in the context of a new band 26 which was recently introduced into Release 10 discussions. This broadcast that multiple bands are supported is to allow new UEs which support the new band 26 to relax their RF requirements as compared to the older defined bands so that, when roaming onto an operator's band, they may then apply the new relaxed requirements, and thereby avoid the UE having to perform interoperability testing (IOT). These proposals are to additionally allow older UEs supporting the older bands to camp on the same cell as well as to allow legacy UEs to camp on the newer band. These proposals seek to adapt the requirement at section 5.4 of 3GPP TS 25.101 v10.2.0 (2011-06) that a cell is allowed to indicate in SI only one frequency band that it supports.

A problem arises in the above solutions when considering UE mobility between cells. A UE performs mobility based on a neighbor list given to it by SI. The conventional practice is that for UMTS, the individual cells on each frequency are listed, and for LTE only the frequency is listed. But if the above proposals of introducing multiple bands support in a cell were adopted, the UE would not know whether the neighbor cell (UMTS) or neighbor frequency (LTE) belongs to a frequency band which the UE supports until after that UE reads SI from the target cell (specifically, SIB5 if the target cell is UMTS and SIB1 if the target cell is LTE). So in some cases the UE will give up on re-selecting to the neighbor cell because of a non-supported frequency band only after the UE performed some mobility related processes (such as neighbor cell measurement, cell quality evaluation, cell reselection, target cell SI reading), which depletes the battery or other portable power source of the UE. Since the UARFCN (UTRA absolute radio frequency channel number) or EARFCN (EUTRA absolute radio frequency channel number) indicated in the neighbor cell/frequency list may belong to multiple bands, the UE cannot determine which band to which it refers.

Further, the serving cell's broadcast of its own UARFCN/EARFCN referring to a specific frequency can be different for a different band; different UARFCN/EARFCN can refer to the same frequency but in a different band/channel. In this case, the neighbor cell/frequency list which the UE uses for mobility purposes would need to be updated to broadcast the same frequency multiple times so that all UEs can reselect. But this then causes a problem in that there is a limited number of cells which can be broadcast in the UTRAN neighbor cell list. Even in some of today's networks, the size limitation imposed by the signalling restrictions of the UTRAN neighbor cell list can restrict the neighbor cell configuration and therefore increasing the size further is not practical. This also causes a problem due to there being a maximum number of frequencies in UTRAN and/or EUTRAN which the UE which is required to measure. In UMTS, the UE is required to be able to measure two frequencies in addition to the carrier (serving cell) frequency, and in LTE the UE is required to measure three frequencies in addition to the carrier frequency. If for example the serving cell supports three bands, the neighbor cell/frequency list size may increase by a factor of three. In principle, the UE could measure three bands if the frequencies are all identical, but this is not required by current radio specifications because currently there is no possibility for a cell to belong to more than one band.

For that reason, this issue was not a concern in the past. While there were some overlapping frequency bands (for example, Band V and Band VI overlap), there was no practical situation that the Band V cell could be signalled as a neighbor cell of a Band VI serving cell and additionally there was no possibility for either the serving or neighbor cell to support multiple bands. The detailed teachings below resolve the above problem which is wasteful of the UE's limited power source.

SUMMARY

According to a first aspect of the present invention, there is provided an apparatus comprising a processing system. The processing system comprising at least one processor and computer-readable memory storing a program, in which the processing system is constructed and arranged to cause the apparatus at least to obtain frequency bands supported by neighbor cells or frequencies, in which there is at least one individual neighbor cell or frequency which supports a plurality of frequency bands. The processing system is constructed and arranged to also cause the apparatus to send to user equipments indications of the frequency bands associated with the respective neighbor cells or frequencies that support them, including the plurality of frequency bands supported by the at least one individual neighbor cell or frequency. The indications of the frequency bands comprise, for each respective neighbor cell or frequency, one absolute radio frequency channel number (ARFCN) associated with the respective neighbor cell or frequency and the frequency band or bands associated with the respective neighbor cell or frequency.

According to a second aspect of the present invention, there is provided a method comprising obtaining frequency bands supported by neighbor cells or frequencies, in which there is at least one individual neighbor cell or frequency which supports a plurality of frequency bands and sending to user equipments indications of the frequency bands associated with the respective neighbor cells or frequencies that support them, including the plurality of frequency bands supported by the at least one individual neighbor cell or frequency. The indications of the frequency bands comprise, for each respective neighbor cell or frequency, one absolute radio frequency channel number (ARFCN) associated with the respective neighbor cell or frequency and the frequency band or bands associated with the respective neighbor cell or frequency.

According to a third aspect of the present invention, there is provided a memory tangibly storing a computer program that is executable by at least one processor, in which the computer program comprises code for obtaining frequency bands supported by neighbor cells or frequencies, in which there is at least one individual neighbor cell or frequency which supports a plurality of frequency bands. The computer program includes code for sending to user equipments indications of the frequency bands associated with the respective neighbor cells or frequencies that support them, including the plurality of frequency bands supported by the at least one individual neighbor cell or frequency. The indications of the frequency bands comprise, for each respective neighbor cell or frequency, one absolute radio frequency channel number (ARFCN) associated with the respective neighbor cell or frequency and the frequency band or bands associated with the respective neighbor cell or frequency.

The processing systems described above may comprise at least one processor; and at least one memory including computer program code. The computer programs described above may be tangibly stored in a computer readable memory.

Further features and advantages of the invention will become apparent from the following description of preferred embodiments of the invention, given by way of example only, which is made with reference to the accompanying drawings.

DETAILED DESCRIPTION

While the two documents noted in the background section above refer to the cell broadcasting in its own SI the additional bands which it supports, those proposals do not go far enough. To avoid the UE undertaking certain mobility procedures as noted above which will in the end prove fruitless due to the UE's incompatibility with a neighbor cell, in an embodiment of these teachings the serving cell will broadcast in its SI an indication of the multiple frequency bands that its individual neighbor cells or neighbor frequencies support. For example, a UTRAN serving cell will broadcast in its own SI indications of the frequency bands which its neighbor UTRAN cells support and which its neighbor LTE frequencies support. For the case of a LTE serving cell, it will broadcast in its own SI indications of the frequency bands which its neighbor frequencies (UTRAN and LTE) support. In this manner, the UE can see the entire list of bands which each neighbor cell or frequency supports, and construct its own locally stored neighbor cell list or neighbor frequency list (which it uses for its mobility choices) by filtering according to the UE's own capabilities on those channels/bands. Since the UE will have the relevant information before reading SI of the neighbor cell, it can avoid performing mobility-related processes directed toward cell reselection to a neighbor cell with which it is incompatible. In case a network does not update the neighbor cell or frequency list, the UE can still use the frequency band information in its previously-defined filtered list to avoid performing measurements in preparation for handover in a particular radio access technology. In these teachings, a new cell which belongs to more than one frequency band can broadcast in the neighbor cell or frequency list that another cell or frequency also belongs to more than one frequency band, such as by indicating the frequency bands in the neighbor's UARFCN and/or EARFCN (depending on whether the neighbor cell is a UMTS or a LTE cell).

Figure 1:
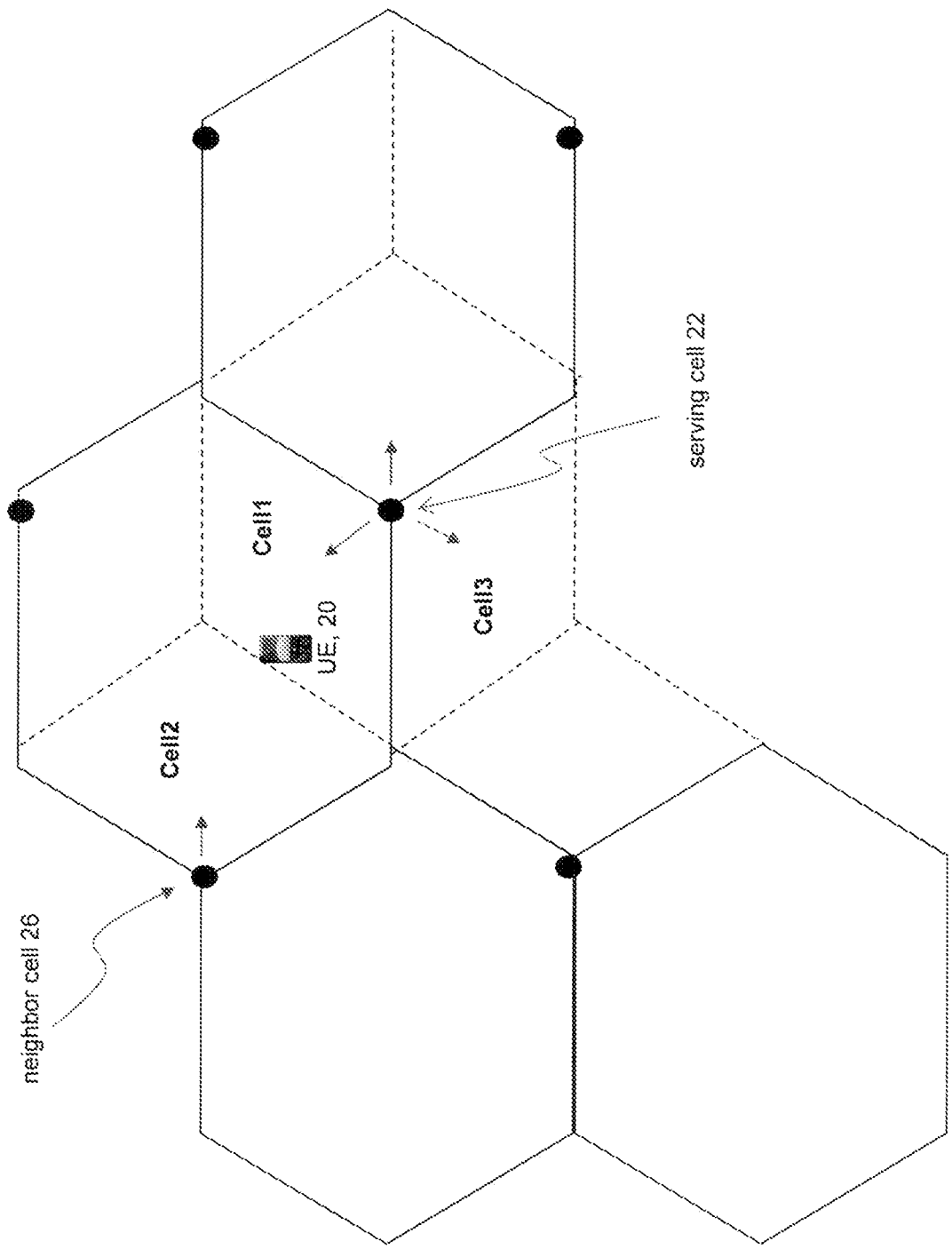
FIG. 1 shows a plan view of a conceptual radio environment in which the various exemplary embodiments detailed herein may be practised to advantage.

Before detailing further specific implementations, reference is made to FIG. 1 for illustrating an exemplary radio environment in which these teachings can be practised to advantage. There is a UE 20 operating in the vicinity of a serving cell 22 and there are multiple neighbor cells operating on multiple neighbor frequencies, of which neighbor cell 26 is exemplary. The specifics vary depending on whether the serving cell 22 and the neighbor cell 26 are operating in the UMTS or the LTE systems, but in general the serving cell 22 will broadcast in its system information indications about all of the frequency bands which the neighbor cells and neighbor frequencies support. The UE 20 will of course get the SI broadcast from the serving cell 22 prior to performing any mobility-related procedures towards a given neighbor cell or neighbor frequency. From the list of frequency bands for the neighbor cells/frequencies, the UE 20 will determine which if any of those bands it supports. The UE 20 will then construct the neighbor cell list using all the neighbor cells and neighbor frequencies it learned from the SI of its serving cell 22, excluding those the UE 20 does not support. When the UE needs to perform some neighbor cell measurement, cell reselection, or other mobility-related process, it will use only those channels on the neighbor cell list that it constructed by filtering using the UE's own capabilities, and so all neighbor cells and frequencies on the UE's locally stored list will be viable to use for cell reselection (assuming sufficient signal strength and other dynamic parameters of the radio environment).

Figure 2:
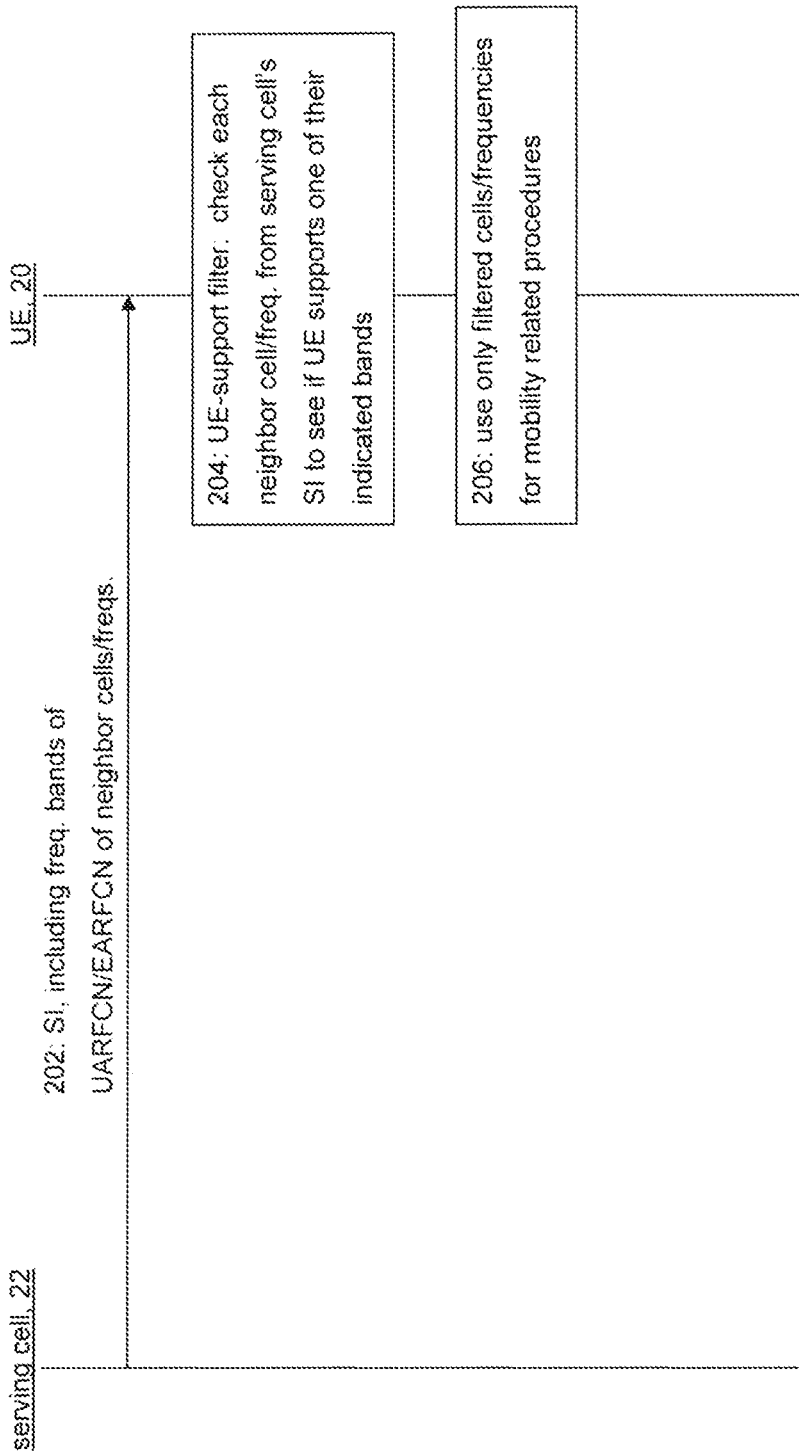
FIG. 2 shows an exemplary signalling diagram showing signalling and internal processes according to exemplary embodiments detailed herein.

FIG. 2 shows an exemplary signalling diagram illustrating signalling and internal processes in the serving cell 22 and the UE 20 according to the above overview. At 202 the serving cell 22 broadcasts its SI, which according to these teachings includes the frequency band information for the UARFCN and/or the EARFCN of each of its neighbor cells/frequencies. At 204 the UE 20, having received the serving cell's broadcast SI 202, then filters all of those neighbor cells/frequencies according to the UE's own frequency band capabilities. Each band the UE supports gets filtered in and each band it does not gets filtered out. In one embodiment, the UE 20 constructs its neighbor cell list with this filtering and stores it in its local memory for use in the cell. That neighbor cell list will include every neighbor cell frequency band that the UE 20 learned from the serving cell's SI 202, as filtered at 204 to exclude all bands which the UE 20 does not support. If for example a particular neighbor cell 26 is assigned to only one frequency band according to the serving cell's SI 202 and if the UE does not support the frequency band, then the UE 20 can exclude the cell from its neighbor cell list. If for example the neighbor cell 26 supports three frequency bands which the UE 20 learns at 202 from the serving cell's SI and the UE 20 supports two of them, then the UE 20 will include the cell into the neighbor cell list, and it keeps those two frequency bands in its memory. The UE 20 uses the neighbor cell list to select which cells/frequencies to measure and re-select on. The reader will recognise that typically there will be multiple neighbor cells and neighbor frequencies whose frequency band or bands (as the case may be) are indicated by the SI of the serving cell 22.

In another embodiment, the UE 20 stores the list it receives from the network, and filters at block 204 on a case by case basis any time the UE 20 is about to start a mobility related procedure, and continues that procedure only if the band relevant to the procedure passes the UE-capability filtering. In this embodiment, the UE does not store the filtered list but runs a stored algorithm that filters the network-supplied list each time it is needed and the same result is obtained. However the filtering of block 204 is implemented, at 206 the UE uses only the neighbor cells/frequencies which are indicated to support a frequency band which is also supported by the UE itself for any mobility related procedure.

From the network perspective, if the neighbor cell 26 is a UMTS cell, the serving cell 22 signals the frequency band information for the UARFCN of that UMTS neighbor cell in the system information broadcasted on the serving cell's broadcast control channel. If the neighbor cell 26 is an LTE cell, the serving cell 22 signals the frequency band information for the EARFCN of the neighbor frequencies in the serving cell's system information. In case the frequency is associated with different bands, the serving cell 22 will signal all of the potential bands that can be found on that frequency.

From the UE's perspective, the UE 20 will collect all of the neighbor cells' associated frequency bands signalled in the serving cell's SI. For those neighbor cells which are UMTS cells, the UE 20 checks that neighbor cell's frequency band information before performing any mobility procedures to that neighbor cell. For a neighbor cell for which all of its assigned frequency bands are not supported by the UE 20, the UE 20 simply discards the UTRAN neighbor cell from its locally stored list. That is, the UE 20 will not attempt any mobility procedure to move to that neighbor UMTS cell whose frequency band or frequency bands the UE 20 does not support. For a neighbor UMTS cell whose frequency band the UE does support, the UE 20 may perform the necessary mobility procedures for that neighbor UMTS cell (assuming it is a good cell reselection candidate in other respects, such as signal strength).

Again from the UE's perspective, for those neighbor frequencies which are associated with LTE cells, the UE 20 simply does not attempt to measure or perform any mobility procedures on that frequency if the UE 20 does not support the frequency bands indicated in the serving cell's SI. This is similar to the UMTS cell procedure except that the LTE cell frequency band information is always given per frequency instead of per cell. There may be cases where there is a mixture of different frequency band cells on one frequency. To address that case, the serving cell 22 can signal in its SI the cell PCI range, a list of each frequency band on a cell or frequency, in order to optimise the UE mobility/reselection attempts. This case is expected to be atypical and likely not even needed due to the increased signalling overhead in SI it represents.

There are multiple ways to implement this increased signalling in the serving cell's SI. The following examples do so by adding an information element to the serving cell's system information which includes a list of frequency band information for all the neighbor cells and neighbor frequencies that support more than one frequency band. For example, if the serving cell 22 is UMTS, it can add that new IE which carries the band information for its multi-band UMTS neighbor cell(s) in the serving cell's system information block type 11 (SIB11) or system information block type 11bis (SIB11bis) or possibly its system information block type 12 (SIB12), and can also add that new IE which carries the band information for its multi-band LTE neighbor frequencies in its system information block type 19 (SIB19). If the serving cell 22 is LTE, it can add the new IE which carries the band information for its multi-band LTE neighbor frequencies in the serving cell's system information block type 3 (SIB3). The number of entries in this new IE is the same as the number of neighbor cells for UMTS and the number of neighbor frequencies for LTE. Each entry indicates the frequency band(s) associated with the corresponding neighbor cell or neighbor frequency in the neighbor cell list or neighbor frequency list. When the UE 20 filters the network supplied neighbor cell list or neighbor frequency list, the UE 20 excludes the cells/frequencies not belonging to the UE supported frequency bands. Then the UE 20 performs cell reselection only on the filtered neighbor cell list or the filtered neighbor frequency list.

In another embodiment, the IE is added by the UMTS serving cell 22 to its SIB11 or SIB11bis (and possibly also its SIB12) for the UMTS neighbor cells and in its SIB19 for its LTE neighbor frequencies. Or if the serving cell 22 is an LTE cell it can add the new IE to its SIB3 for all its neighbor frequencies. In these embodiments, the IE can indicate an index and one or more frequency bands for each neighbor cell/frequency. The index, X for example, would indicate that the neighbor cells/frequencies from the 1st neighbor cell/frequency to the $X^{th}$ neighbor cell/frequency in the neighbor cell/frequency list belong to the frequency band(s) signalled in the same new IE. If more than one new IE is included in the SIB, then the subsequent IE's index, Y for example, would indicate that the neighbor cells/frequencies from (the previous IE's index+1)$^{th}$ neighbor cell/frequency to the Y$^{th}$ neighbor cell/frequency in the neighbor cell/frequency list belong to the frequency band(s) signalled in the same IE. This can be repeated for additional indices. The UE 20 would then filter and exclude as in the above paragraph and perform cell reselection using its filtered neighbor cell/frequency list.

In another embodiment, instead of a new IE in an existing SIB, the information on the neighbor cell frequency bands is informed to the UEs via a new SIB, for example SIB21 in the case of UMTS cells and SIB14 in the case of LTE frequencies. Including the IE similar to that noted above in one or both of these new SIBs is a simple way to present the frequency band information to the UEs. In one implementation, there is one entry in this new IE for each of the neighbor cells/frequencies, and each entry indicates the frequency band(s) associated with the corresponding neighbor cell/frequency in the neighbor cell/frequency list. In another implementation, the IE indicates the index and the frequency band(s) for each neighbor cell/frequency as detailed above.

One technical effect of these teachings is that the UE 20 can identify from its serving cell SI which neighbor cells/frequencies, including all cells/frequencies on a frequency band, can be considered as a candidate suitable cell/frequency for cell reselection before performing any mobility procedures. This saves on UE battery consumption as noted in the background section above. Relatedly, implementing these teachings are seen to result in more effective cell reselection by the UE since there will be fewer failed/aborted cell reselections.

On the network side, one technical effect is that the network operator can deploy multiple harmonised band cells without affecting UE battery life. The size of the neighbor cell/frequency list is unaffected, and so there is no need to utilise additional entries to refer to the same cell since the additional frequency band information can extend the applicability of a single UARFCN/EARFCN to refer to multiple bands. For this reason, implementation of these teachings is not seen to affect the stipulated performance requirements.

Figure 3:
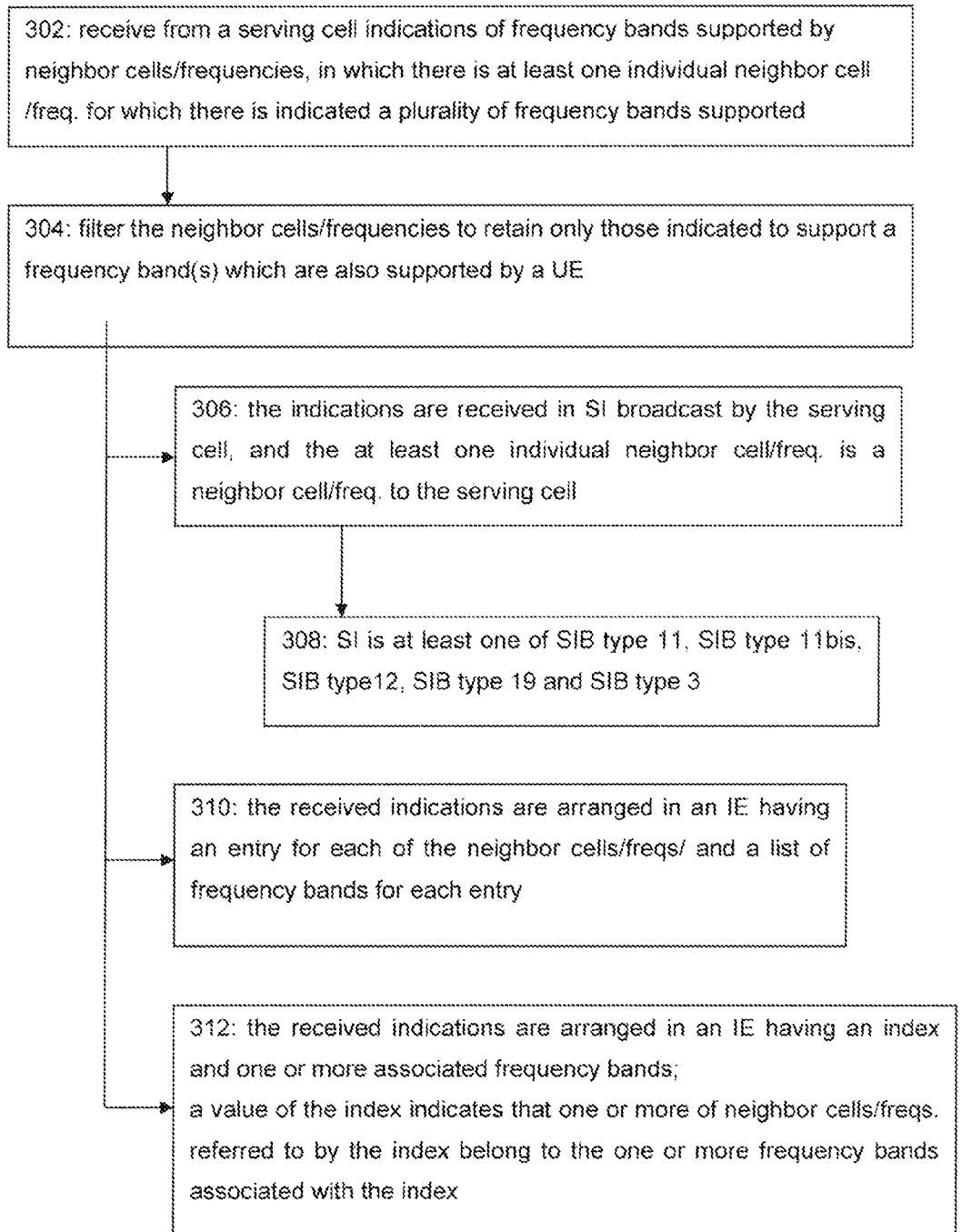
FIG. 3 shows a logic flow diagram illustrating from the perspective of the UE the operation of a method, and a result of execution of computer program instructions embodied on a computer readable memory, for practising exemplary embodiments of these teachings.
Figure 4:
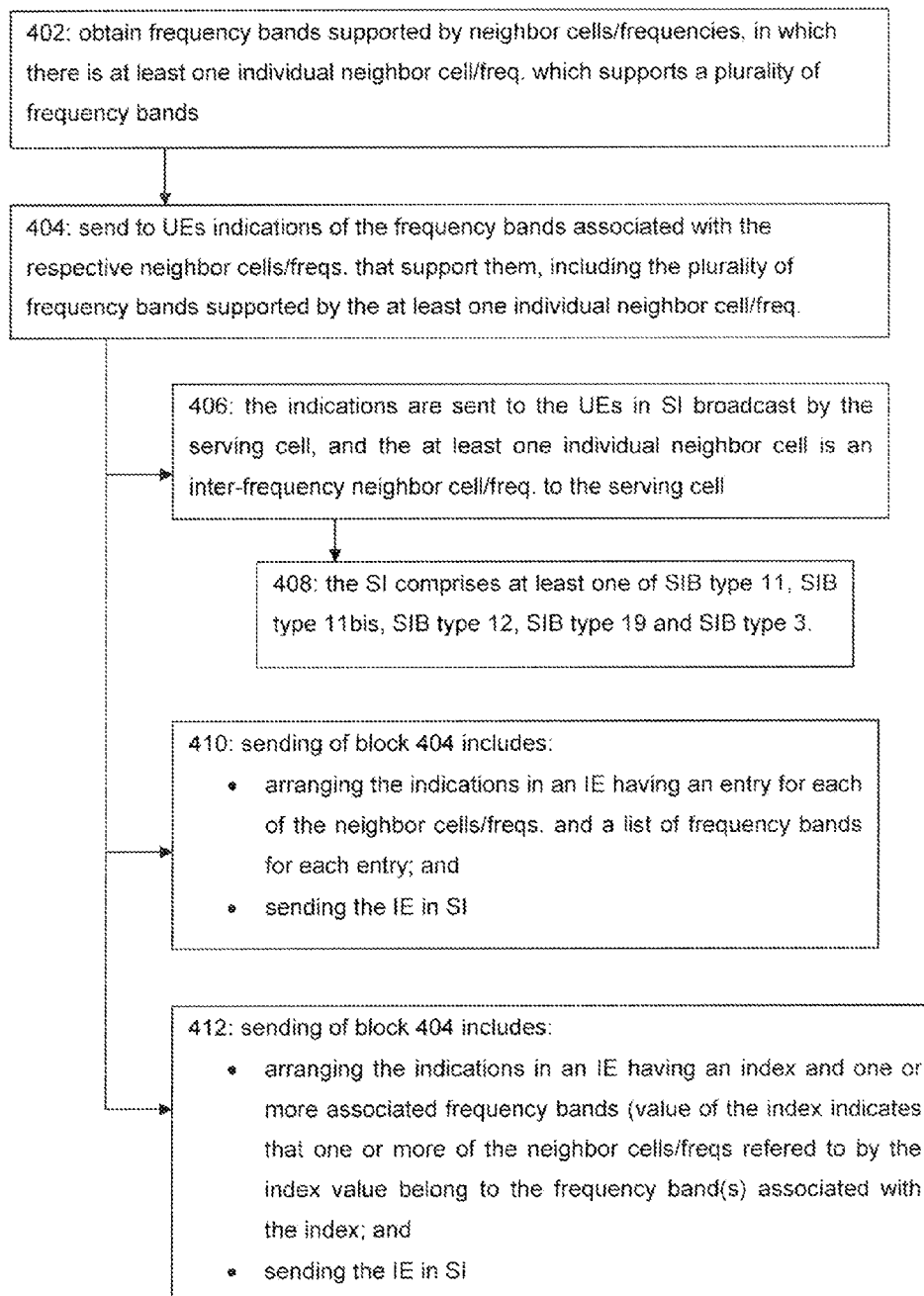
FIG. 4 shows a logic flow diagram illustrating from the perspective of the serving cell/serving access node the operation of a method, and a result of execution of computer program instructions embodied on a computer readable memory, for practising exemplary embodiments of these teachings.

FIGS. 3 and 4 show logic flow diagrams which may each be considered to illustrate the operation of a method, and a result of execution of a computer program stored in a computer readable memory, and a specific manner in which components of an electronic device are configured to cause that electronic device to operate. The various blocks shown in each of FIGS. 3 and 4 may also be considered as a plurality of coupled logic circuit elements constructed to carry out the associated function(s), or specific result of strings of computer program code stored in a memory.

Such blocks and the functions they represent are non-limiting examples, and may be practised in various components such as integrated circuit chips and modules, and the exemplary embodiments of this invention may be realised in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

FIG. 3 details particular exemplary embodiments of the invention from the perspective of the UE. The logic of FIG. 3 may be implemented by the entire UE or by one or more components thereof, more generally termed an apparatus. At block 302 of FIG. 3, the UE receives from its serving cell indications of frequency bands supported by neighbor cells or frequencies, in which there is at least one individual neighbor cell or frequency for which there is indicated a plurality of frequency bands supported. At block 304 the UE 20 filters the neighbor cells or frequencies to retain only those that are indicated to support a frequency band or bands which are also supported by the UE itself. As in the above examples, the UE may filter to generate a new list which it stores in its local memory and checks each time it needs to run a mobility procedure on a new band, or it may store the network-provided neighbor cell/frequency list and filter out those that only support a band or bands for which the UE is not capable on an as needed basis when checking each new neighbor cell/frequency for a mobility related procedure.

Further portions of FIG. 3 are optional and may or may not be combined with one another in various embodiments. Block 306 details that the indications are received in system information broadcast by the serving cell and the at least one individual neighbor cell or neighbor frequency is a neighbor cell or frequency to the serving cell. Block 308 specifies that the system information comprises at least one of system information block types 11, 11bis, 12, 19 and 3 as detailed in the examples above.

Block 310 specifies one embodiment of the IE above, that the received indications are arranged in an information element having an entry for each of the neighbor cells or neighbor frequencies and a list of frequency bands for each entry. Block 312 specifies another embodiment of the IE above, that the received indications are arranged in an information element having an index and one or more associated frequency bands, in which a value of the index (X) indicates that one or more of the neighbor cells/frequencies referred to by the index (1st through the X$^{th}$) belongs to the one or more frequency bands associated with the index. There can of course be more than one index in the IE of this embodiment with different indices referring to a different plurality of neighbor cells/frequencies and associated with a different band or bands.

From the above description and examples, the UE functioning according to the FIG. 3 embodiment is configured to utilise that filtered neighbor cell/neighbor frequency list for its own cell reselection processes.

FIG. 4 details particular exemplary embodiments of the invention from the perspective of the serving cell 22 which sends its SI with all of the neighbor cells' or neighbor frequencies' associated frequency bands. The logic of FIG. 4 may be implemented by the entire serving cell (more generally a wireless network access node) or by one or more components thereof, which is also more generally termed an apparatus. At block 402 of FIG. 4, the serving cell obtains frequency bands supported by neighbor cells or neighbor frequencies, in which there is at least one individual neighbor cell or neighbor frequency that supports a plurality of frequency bands. The serving cell may determine this band information itself, such as by collecting that information from the neighbor cells directly via an X2 or similar interface, or the neighbor cells and associated frequency bands may be obtained from a higher network node, such as a radio network controller or mobility management entity. At block 402 the "individual neighbor cell or neighbor frequency" is used to better specify that, from among the whole neighbor cell/frequency list which the serving cell compiles, there is at least one of them that supports multiple frequency bands since not all of the neighbor cells/frequencies may be multi-band capable. However the serving cell obtains this frequency band data, it then at block 404 sends to UEs indications of the frequency bands associated with the respective neighbor cells/neighbor frequencies that support them, including the plurality of frequency bands supported by the at least one individual neighbor cell or neighbor frequency.

Further portions of FIG. 4 are optional and may or may not be combined with one another in various embodiments. Block 406 states as with the above exemplary examples that the indications are sent to the UEs in system information broadcast by the serving cell, and the at least one individual neighbor cell/neighbor frequency is a neighbor cell/frequency to the serving cell. Block 408 recites the SIBs from the above examples: the indications are added to at least one of system information block types 11, 11bis, 12, 19 and 3.

Blocks 410 and 412 show the different embodiments of the new IE that are detailed above. At block 410 the serving cell sends the indications of block 404 by first arranging the indications in an IE having an entry for each of the neighbor cells/neighbor frequencies and a list of frequency bands for each entry, and then sends the IE in SI. The other embodiment from the above examples is at block 412, where the sending of block 404 is implemented by the serving cell first arranging the indications in an information element having an index and one or more associated frequency bands, in which a value of the index indicates that one or more of the neighbor cells or frequencies that are referred to by the index belongs to the one or more frequency bands associated with the index; and then the serving cell sends this IE in its SI.

Figure 5:
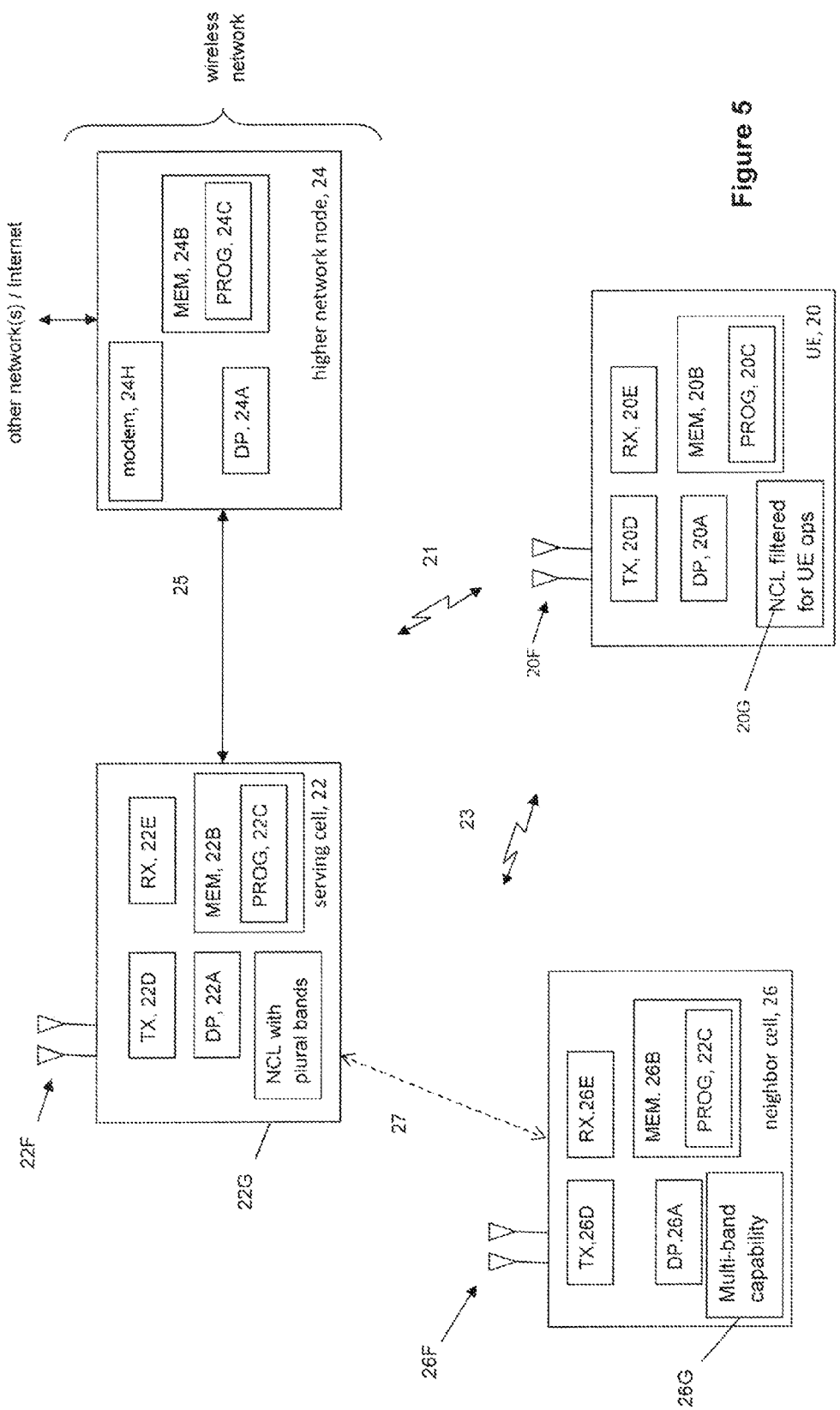
FIG. 5 shows a simplified block diagram of some of the devices shown at FIG. 1 which are exemplary electronic devices suitable for use in practising the exemplary embodiments of this invention.

Reference is now made to FIG. 5 for illustrating a simplified block diagram of various electronic devices and apparatus that are suitable for use in practising the exemplary embodiments of this invention. In FIG. 5 there is a serving cell/serving network access node 22 and a neighbor cell/ neighbor network access node 26, which are adapted for communication over respective wireless links 21, 23 with an apparatus 20 such as mobile terminals or termed more generally as a user equipment UE. In certain networks, such as LTE, there is also an interface 27 between the serving 22 and neighbor 26 cell. The illustrated neighbor cell 26 stands in the place of the "at least one individual neighbor cell or neighbor frequency" noted above for FIGS. 3 and 4, but there are typically other neighbor cells/frequencies to the serving cell 22 some or all of which may also support multiple frequency bands. The serving cell 22 may be further communicatively coupled via link 25 to a higher network node 24, such as a mobility management entity/serving gateway MME/S-GW 24 in the case of the LTE system or a radio network controller in the case of the UMTS system.

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the serving cell 22 and with the neighbor cell 26 via one or more antennas 20F. Within the memory 20B of the UE 20 but shown separately as reference number 20G is also a computer program for filtering, according to the UE capabilities, the list of neighbor cells/neighbor frequencies which the UE 20 receives from the serving cell's system information as is detailed above in various embodiments.

The serving cell 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with its associated user devices 20 via one or more antennas 22F and a modem. The serving cell 22 also has stored in its memory at 22G software to assemble in its system information broadcasts all of the neighbor cells/frequencies and all of their associated frequency bands as is detailed by example above. The serving cell 26 is similarly functional with blocks 26A, 26B, 26C, 26D, 26E and 26F, but its block 26G simply has its own multi-channel capability which the serving cell 22 learns via the interface 27 (if the LTE system) or via the higher network node 24/radio network controller (if a UMTS system). It should be noted that the neighbor cell 26 has the same functionality according to these teachings as the serving cell 22 which it uses when sending its own SI to its UEs. By example, the serving cell 22 may be a node B (UMTS) or an e-NodeB (LTE), the neighbor cell 26 may be a node B (UMTS) or an e-NodeB (LTE), and in the case of the LTE system the interface 27 may be an X2 interface between them.

For completeness the higher network node 24 is also shown to include a DP 24A, and a MEM 24B storing a PROG 24C, and additionally a modem 24H for communicating with at least the serving cell 22 (to show embodiments in which the neighbor cell is not under the same higher network node). Whilst not particularly illustrated for the UE 20 or cells 22, 26, those devices are also assumed to include as part of their wireless communicating means a modem which may in one exemplary but non-limiting embodiment be inbuilt on an RF front end chip so as to carry the respective TX 20D/22D/26D and RX 20E/22E/26E.

At least one of the PROGs 20C, 22C, 26C in the UE 20 and in the serving and neighbor cells 22, 26 is assumed to include program instructions that, when executed by the associated DP 20A, 22A, 26A, enable the device to operate in accordance with the exemplary embodiments of this invention as detailed more fully above. In this regard, the exemplary embodiments of this invention may be implemented at least in part by computer software stored on the MEM 20B, 22B, 26B which is executable by the DP 20A, 22A, 26A of the respective devices 20, 22, 26; or by hardware, or by a combination of tangibly stored software and hardware (and tangibly stored firmware). Electronic devices implementing these aspects of the invention need not be the entire UE 20, or serving cell 22, or neighbor cell 26, but exemplary embodiments may be implemented by one or more components of same such as the above described tangibly stored software, hardware, firmware and DP, or a system-on-a-chip SOC or an application specific integrated circuit ASIC or a digital signal processor DSP or a modem or a subscriber identity module (such as a SIM card).

Various embodiments of the UE 20 can include, but are not limited to: cellular telephones; data cards, USB dongles, personal portable digital devices having wireless communication capabilities including but not limited to laptop/palmtop/ tablet computers, digital cameras and music devices, and Internet appliances.

Various embodiments of the computer readable MEM 20B, 22B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A, 22A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant art in view of the foregoing description. While the exemplary embodiments have been described above principally in the context of the UMTS and LTE/LTE-A systems, it should be appreciated that the exemplary embodiments of this invention are not limited for use with only these particular types of wireless communication system, and that they may be used to advantage in other wireless communication systems, such as for example WCDMA and others which may interface with a neighbor cell that supports multiple frequency bands.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An apparatus comprising:
   a processing system comprising at least one processor and a computer-readable memory storing a program, in which the processing system is constructed and arranged to cause the apparatus at least to:
   receive at a user equipment from a serving cell indications of frequency bands supported by respective neighbor cells, said indications comprising for at least one individual neighbor cell one absolute radio frequency channel number (ARFCN) associated with the at least one individual neighbor cell and a plurality of frequency bands associated with the at least one individual neighbor cell;
   from the received indications, derive at the user equipment from the indicated one ARFCN and the plurality of frequency bands at least one other ARFCN; and
   determine which frequency bands, of at least the one ARFCN and the at least one other ARFCN, are supported by the user equipment and retain the determined frequency bands in a local memory of the user equipment for mobility operations.

2. The apparatus according to claim 1, in which the indications are received in system information broadcast by the serving cell, and the at least one individual neighbor cell is a neighbor cell to the serving cell.

3. The apparatus according to claim 2, in which the indications are received in at least one of system information block types 11, 11bis, 12, 19 and 3.

4. The apparatus according to claim 1, in which the indications are received in system information, in an information element having an entry for each of the neighbor cells and a list of frequency bands for each entry.

5. The apparatus according to claim 1, in which the indications are received in system information, in an information element having an index and one or more associated frequency bands, in which a value of the index indicates that one or more of the neighbor cells referred to by the index belongs to the one or more frequency bands associated with the index.

6. The apparatus according to claim 1, wherein the indications are such that each of the neighbor cells supports a plurality of frequency bands.

7. The apparatus according to claim 1, wherein the user equipment receives the indications from at least one of:
   a node B while the user equipment is operating in a universal mobile telecommunications system (UMTS), and
   an evolved node B while the user equipment is operating in an evolved universal terrestrial radio access network (EUTRAN).

8. A method comprising:
   receiving at a user equipment from a serving cell indications of frequency bands supported by respective neighbor cells, said indications comprising for at least one individual neighbor cell one absolute radio frequency channel number (ARFCN) associated with the at least one individual neighbor cell and a plurality of frequency bands associated with the at least one individual neighbor cell;
   from the received indications, deriving at the user equipment from the indicated one ARFCN and the plurality of frequency bands at least one other ARFCN; and
   determining which frequency bands, of at least the one ARFCN and the at least one other ARFCN, are supported by the user equipment and retaining the determined frequency bands in a local memory of the user equipment for mobility operations.

9. The method according to claim 8, in which the indications are received in system information broadcast by the serving cell, and the at least one individual neighbor cell is a neighbor cell to the serving cell.

10. The method according to claim 9, in which the indications are received in at least one of system information block types 11, 11bis, 12, 19 and 3.

11. The method according to claim 8, in which the indications are received in system information, in an information element having an entry for each of the neighbor cells and a list of frequency bands for each entry.

12. The method according to claim 8, in which the indications are received in system information, in an information element having an index and one or more associated frequency bands, in which a value of the index indicates that one or more of the neighbor cells referred to by the index belongs to the one or more frequency bands associated with the index.

13. The method according to claim 8, wherein the indications are such that each of the neighbor cells supports a plurality of frequency bands.

14. A memory tangibly storing a computer program that is executable by at least one processor, in which the computer program comprises:
   code for deriving at least one other absolute radio frequency channel number (ARFCN) from indications received at a user equipment from a serving cell of frequency bands supported by respective neighbor cells, said indications comprising for at least one individual neighbor cell one ARFCN associated with the at least one individual neighbor cell and a plurality of frequency bands associated with the at least one individual neighbor cell; and
   code for determining which frequency bands, of at least the one ARFCN and the at least one other ARFCN, are supported by the user equipment and for retaining the determined frequency bands in a local memory of the user equipment for mobility operations.

15. The memory according to claim 14, in which the indications are received in system information broadcast by the serving cell, and the at least one individual neighbor cell is a neighbor cell to the serving cell.

16. The memory according to claim 15, in which the indications are received in at least one of system information block types 11, 11bis, 12, 19 and 3.

17. The memory according to claim 14, in which the indications are received in system information, in an information element having an entry for each of the neighbor cells and a list of frequency bands for each entry.

18. The memory according to claim 14, in which the indications are received in system information, in an information element having an index and one or more associated frequency bands, in which a value of the index indicates that one or more of the neighbor cells referred to by the index belongs to the one or more frequency bands associated with the index.

19. The memory according to claim 14, wherein the indications are such that each of the neighbor cells supports a plurality of frequency bands.

20. The memory according to claim 14, wherein the user equipment receives the indications from at least one of:
   a node B while the user equipment is operating in a universal mobile telecommunications system (UMTS), and
   an evolved node B while the user equipment is operating in an evolved universal terrestrial radio access network (EUTRAN).

* * * * *